United States Patent [19]
Green, Jr.

[11] Patent Number: 5,926,133
[45] Date of Patent: Jul. 20, 1999

[54] DIFFERENTIALLY CORRECTED POSITION LOCATION SYSTEM AND METHOD FOR MOBILE COMMUNICATION NETWORKS

[75] Inventor: Donald R. Green, Jr., San Marcos, Calif.

[73] Assignee: Denso Corporation, Kariya, Japan

[21] Appl. No.: 08/897,315

[22] Filed: Jul. 21, 1997

[51] Int. Cl.$^6$ .................................................. H01Q 21/06
[52] U.S. Cl. ........................ 342/363; 342/450; 342/457; 342/463; 379/59; 455/33.1; 455/422
[58] Field of Search ..................................... 342/363, 450, 342/457, 463–465; 379/59, 60, 185; 455/33.1, 422, 575

[56] References Cited

U.S. PATENT DOCUMENTS

| | | | |
|---|---|---|---|
| 3,680,121 | 7/1972 | Anderson et al. | 343/112 TC |
| 4,728,959 | 3/1988 | Maloney et al. . | |
| 5,119,104 | 6/1992 | Heller | 342/450 |
| 5,223,844 | 6/1993 | Mansell et al. . | |
| 5,225,842 | 7/1993 | Brown et al. . | |
| 5,311,194 | 5/1994 | Brown . | |
| 5,365,516 | 11/1994 | Jandrell | 370/18 |
| 5,379,224 | 1/1995 | Brown et al. . | |
| 5,422,813 | 6/1995 | Schuchman et al. . | |
| 5,512,908 | 4/1996 | Herrick . | |
| 5,548,583 | 8/1996 | Bustamante . | |

OTHER PUBLICATIONS

IEEE Communication Magazine, Oct. 1996 Position Location Using Wireless Communications on Highways of the Future, T.S. Rappaport et al, pp. 33–41 (Also see Appln. p. 6).

*Primary Examiner*—Thomas H. Tarcza
*Assistant Examiner*—Dao L. Phan
*Attorney, Agent, or Firm*—Fish & Richardson P.C.

[57] ABSTRACT

A system for determining the location of portable communication devices such as cellular telephones and the like has multiple small, dedicated multipath calibration transponders at known positions. When a portable communication device initiates a call, base stations in the coverage area direct the transponders to generate response signals which are received by the base stations. The characteristics of the signals from the portable device and the transponders are provided to a base station controller linked to the base stations. The base station controller derives a coarse position using the raw device position information and uses the raw transponder position information and the transponder's known positions to derive a correction vector representative of multipath distortion of transponder signals in the area of the portable device. Since the portable device will generally experience the same distortion as the transponders in its area, the correction vector can be applied to the coarse device position to obtain its true position.

47 Claims, 9 Drawing Sheets

DIFFERENTIALLY CORRECTED POSITION LOCATION SYSTEM AND METHOD FOR MOBILE COMMUNICATION NETWORKS

BACKGROUND OF THE INVENTION

1. Field of the Invention

The present invention is directed to a system for locating the position of a unit in a communication network and to a method for performing such position location. More specifically, it is directed to a system and method for performing position location in a mobile communication network such as a cellular telephone or personal communication system (PCS) network.

2. Description of Related Art

The ever-increasing popularity of mobile communication devices such as cellular telephones and the like brings with it a need for increased reliability and functionality of those devices. As users come to rely on wireless telephone networks more and more and those telephones become ubiquitous in everyday life, the networks must be capable of accommodating an ever-widening range of demands.

One such demand, promulgated in June, 1996 by the U.S. Federal Communications Commission (FCC) as FCC Docket Number 94-102, requires that future wireless services provide a site location feature for its mobile units. This feature is primarily for use in providing emergency call service capability, complementary to the emergency 911 (E-911) service familiar to most wireline telephone users. To provide emergency services to a caller, it is advantageous for any communication system used to make an emergency call to be able to automatically identify the location of the caller. This is because in emergency situations time is of the essence and further, the caller may not know his or her location, may give an incorrect or otherwise inaccurate location, or may become incapacitated during the course of the call.

In the case of wireline networks, such position identification is a relatively simple matter of correlating the caller's telephone number with a list of numbers and corresponding addresses. In the case of wireless E-911 service, however, the very mobility which makes the portable telephones so useful precludes a simple lookup technique for position location. Thus, a method of "dynamic" position location must be used in mobile networks.

A number of position location systems are based on the Global Positioning System (GPS) implemented by the U.S. Department of Defense (DoD). GPS is a constellation of twenty-four active satellites circling the earth in precisely timed and controlled orbits so that between five and eight satellites are theoretically in line-of-sight radio contact with any point on earth at a given time. Each satellite broadcasts a uniquely-coded signal which can be picked up by an appropriately equipped GPS receiver, or "rover". The rover timing is synchronized with that of the satellites and is equipped with ephemeral data that allows it to precisely calculate the position of each of the satellites at any given time. It receives signals from three or more of the satellites and calculates its distance from each based on the travel time of its respective signal. Each of the distances defines a sphere centered on its respective satellite, and the intersection of all spheres is the actual location of the rover.

GPS position location is not perfect, however. Various sources of errors can cause the rover's detected position to differ from its actual position significantly, and their combined effect may even be to prevent the system from meeting the minimum 125 meter accuracy requirement set by the FCC. In civilian applications, the largest error source by far is called "selective availability" and is the result of the DoD deliberately decreasing the integrity of the civilian portion of the GPS satellite signals to deny hostile parties high-accuracy positioning capability. Other errors are due to natural conditions, such as ionospheric and tropospheric conditions, and some, such as satellite clock and orbit errors, receiver noise and multipath propagation effects, stem from artificial sources.

Multipath propagation results when a radio wave travels from a source (e.g., a GPS satellite) to a destination (e.g., a rover) through a space populated with objects that reflect radio waves. As shown in FIG. 1, if a line-of-sight path exists between the satellite and rover, direct reception occurs via a true signal TS. However, the signal may be reflected off of objects in the region to produce reflected waves which travel a longer distance and therefore are delayed relative to the original signal and appear as separate signals to the rover. Multipath reflection signals may include components from two sources: static components which result from reflections off of stationary objects such as mountains, buildings and the like, such as signal SR; and dynamic components which result from reflections off of moving objects such as vehicles, such as signal DR.

FIGS. 2A–2C show the effects of multipath propagation on the position location process. FIG. 2A shows an idealized typical topography, e.g., a city area of several blocks. FIG. 2B shows the same area as it might appear to rovers in the area based on GPS position information distorted by multipath propagation. FIG. 2C shows how the position of a rover in the area might be mistakenly detected based on such corrupted information.

Although the deleterious effects of multipath propagation have been illustrated in the context of GPS position location, such problems will of course be encountered in many types of communication with a rover, e.g., communication from a base station or the like.

With the exception of multipath propagation, all of these errors are experienced by receivers in the same general area to an equal degree, and a technique called "differential GPS" (DGPS) makes use of this fact to increase position location accuracy. DGPS uses a reference receiver whose actual position is precisely known in proximity to the mobile receiver. The reference receiver calculates its predicted position based on signals from the GPS satellites and compares it to its actual, precisely known position to derive a differential correction. This information is passed along to the rover via a separate information channel, e.g., radio, and is used by the rover to correct its position. Multipath propagation effects cannot be corrected in this way, since they change significantly with a small change in position and a particular set of corrections are generally valid only for a given rover at a given location at a given moment in time.

It is possible to incorporate a rover into a mobile telephone unit and to provide the GPS positional information during an E-911 session; however, this approach has some drawbacks. For example, GPS receivers are relatively expensive, and including such a unit in a cellular telephone or the like would substantially increase its cost (particularly one with DPGS capability). Further, GPS receivers are complicated electronic devices which consume significant amounts of power. Inclusion of one in a portable telephone would either shorten the telephone's battery life or require the use of larger capacity (and consequentially larger size) batteries. Thus, the telephone's size must be increased to accommodate the batteries and the additional GPS circuitry.

Moreover, GPS satellites provide a relatively weak, high frequency (carriers in the range of 1.2–1.6 GHz) signal which does not penetrate buildings and other dense structures well and which requires the use of specialized directional antennas. Additionally, DPGS operation requires the use of reference receivers which are not universally available. Further, the first position determination by a GPS receiver after it is turned on (called a "cold reading", as opposed to a "hot reading" made by a unit that has been operating for a period of time) can take up to fifteen minutes—clearly unacceptable in the E-911 environment. Finally, the need for a GPS receiver in each handset would mean that existing handsets lacking such functionality could not be used for wireless E-911 position determination.

Some of these problems are solved by a technique called "cellular geolocation", in which cellular base stations monitor transmissions from a mobile unit (typically, reverse voice channel or reverse control channel transmissions) and apply an angle of arrival (AOA) or time difference of arrival (TDOA) technique to the transmissions to determine the position of the unit. As described in Rappaport et al., "Position Location Using Wireless Communications on Highways of the Future", *IEEE Communications Magazine* pp. 33–41 (Oct. 1996), the AOA technique uses highly directional antennas to determine the precise angle at which each base station receives the mobile unit transmission, and the mobile unit's position is resolved by triangulation with the known positions of the base stations. Much like GPS, the complementary TDOA technique measures the relative delay in reception of the mobile transmissions at each base station, determines the distance traveled by the transmissions to each base station based on its respective delay, and resolves the mobile unit's position by resection.

These approaches, however, are still susceptible to position determination errors resulting from multipath propagation and other effects. The need to take such error sources into account cannot be overlooked in E-911 applications, and is particularly critical in congested urban areas where users are in close quarters and concentrated multipath environments exist.

SUMMARY OF THE INVENTION

In view of the above problems of the prior art, it is an object of the present invention to provide a position location system for mobile communication networks which is capable of making highly accurate position determinations.

It is another object of the present invention to provide a position location system for mobile communication networks that is largely unaffected by multipath propagation effects.

It is still another object of the present invention to provide a position location system for mobile communication networks that provides accurate position determinations independently of satellite and atmospheric-related errors and the like.

It is yet another object of the present invention to provide a position location system for mobile communication networks that provides accurate position determinations and does not require the use of handsets having special functionality.

The above objects are achieved by providing multiple small, dedicated multipath calibration transponders in the coverage area of the base stations at known positions. When a rover initiates an E-911 session, the base stations direct the transponders to generate response signals. These response signals are received by the base stations, and the characteristics of the signals from the rover and the transponders are provided to a base station controller linked to the base stations. The base station controller derives a coarse position using the raw rover position information and uses the raw transponder position information and their known positions to derive a correction vector representative of multipath distortion of transponder signals in the area of the rover. Since the rover will generally experience the same distortion as the transponders in its area, the correction vector can be applied to the coarse rover position to obtain its true position.

Alternatively, rather than deploying an array of transponders, multipath distortion effects at multiple sites may be logged in advance using a single transmitter and stored by the base station controller. Then, in place of the base stations directing the transponders to issue response signals, the base station controller can derive a correction vector for the rover's position based on the logged site data and use that vector to correct the coarse rover position.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
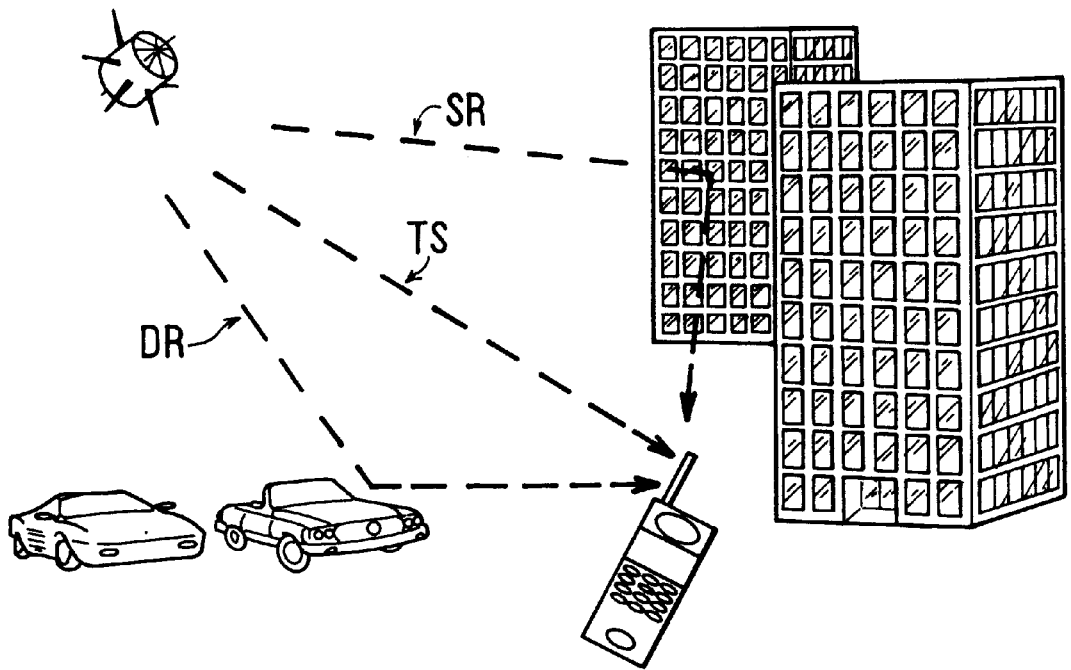
FIG. 1 shows typical avenues of multipath propagation between a GPS satellite and a rover.
Figure 2A:
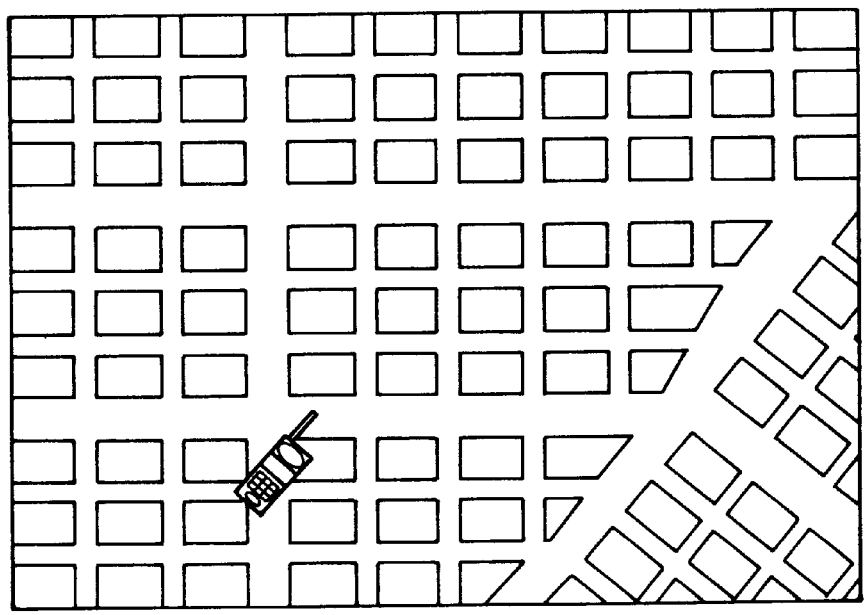
FIGS. 2A–2C show the distortion of a rover's position due to multipath effects in an urban topography.
Figure 2B:
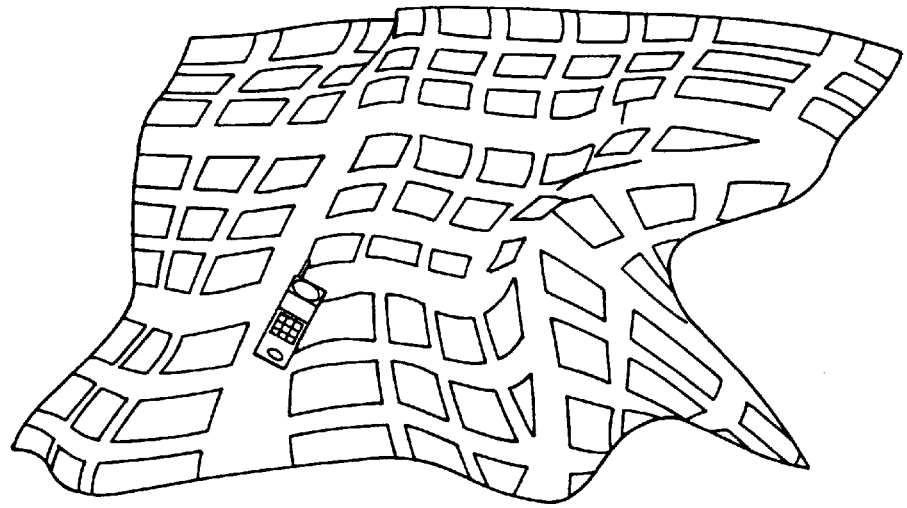
Figure 2C:
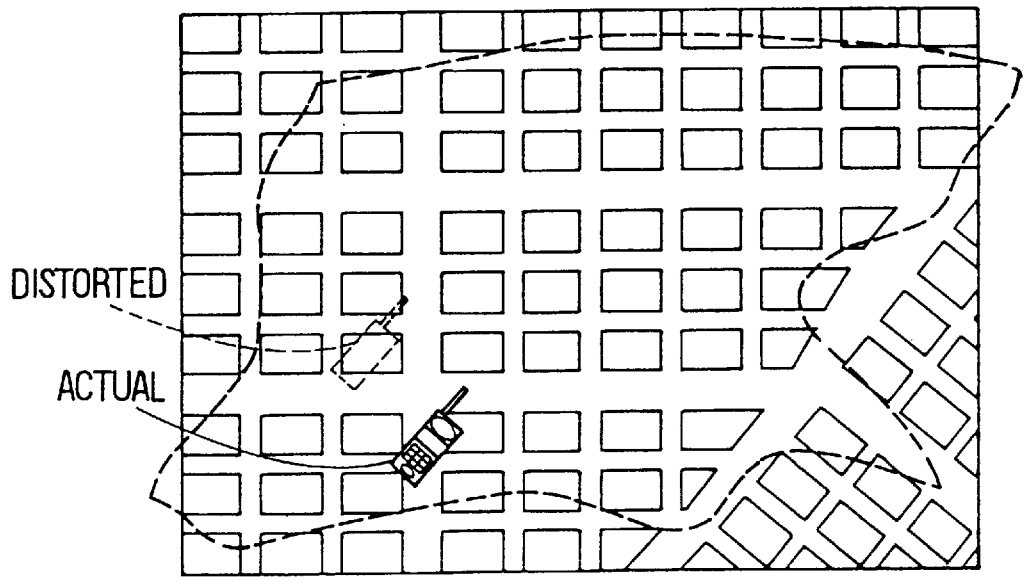
Figure 3:
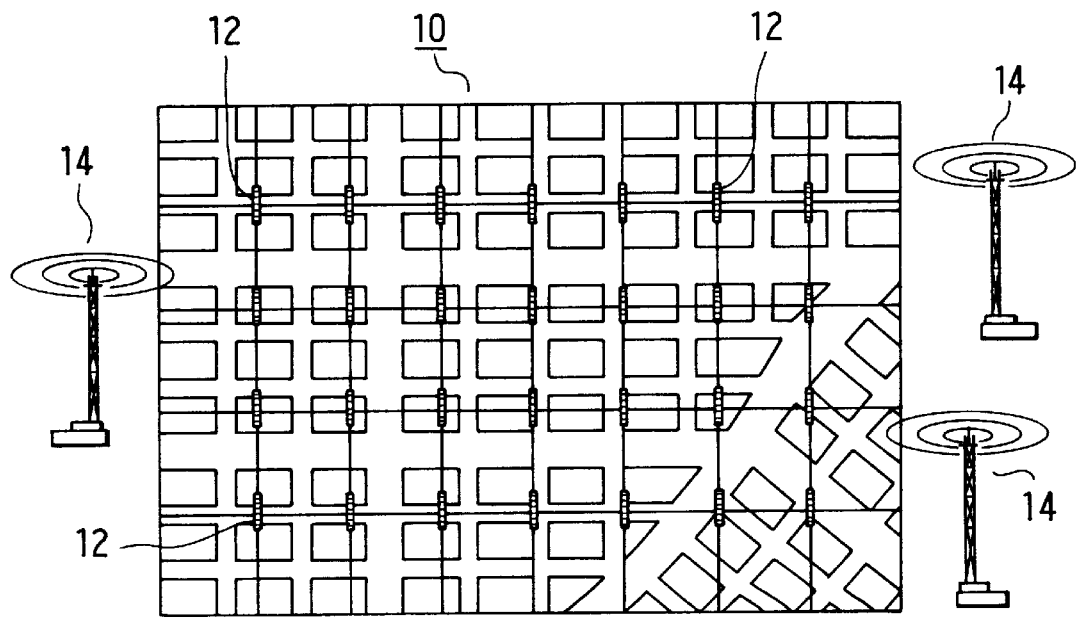
FIG. 3 shows a first preferred embodiment of the present invention in such a topography.
Figure 6:
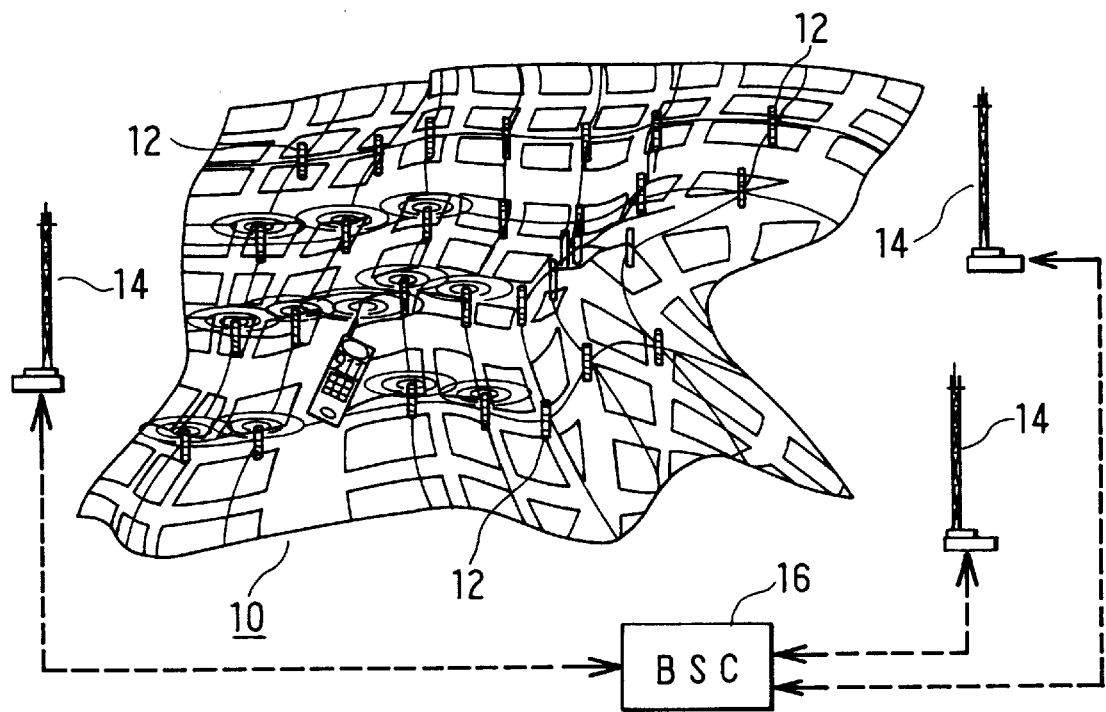
FIG. 6 shows the operation of base stations, transponders and a base station controller to determine the position of a rover under multipath distortion conditions in the first embodiment.

A coverage area 10 of a mobile communication system has a constellation of multipath calibration transponders 12 disposed at predetermined, precisely known locations therein as shown in FIG. 3. In addition to the transponders 12, the system also includes several base stations 14 which are within the communication range of the transponders 12, located at precisely known positions and separated from one another by relatively large distances, and a base station controller 18 (shown in FIG. 6) which controls transactions between base stations 14.

Figure 4:
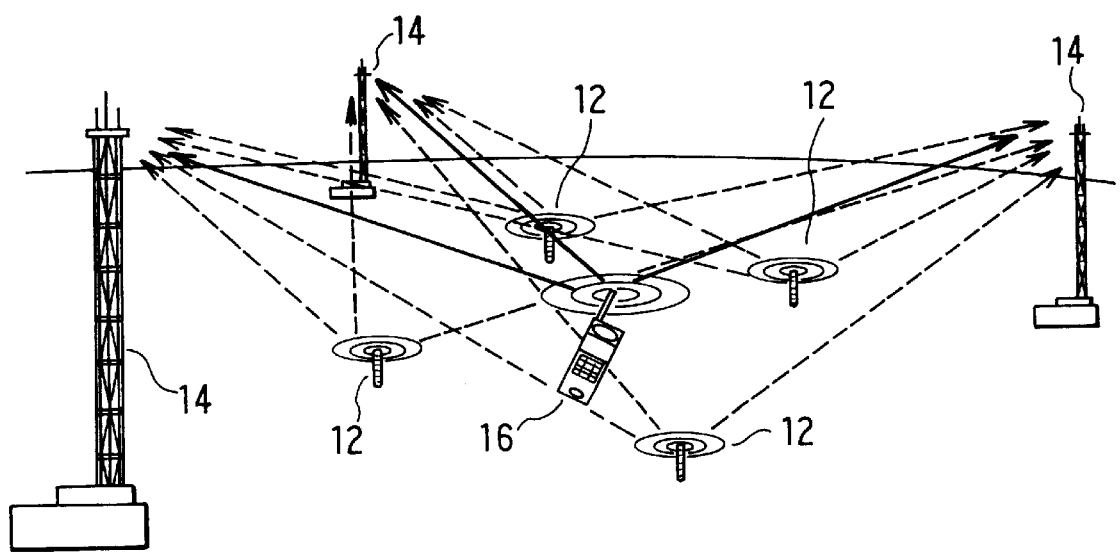
FIG. 4 shows transponders according to the first embodiment providing response signals to base stations for differential correction of a rover position.

When, for example, a rover 16 places an E-911 call and it is necessary to determine its position, the base stations 14 each receive a signal from the rover 16 as shown by the solid arrows in FIG. 4. Normally, position determination using an AOA, TOA or TDOA technique based on the signals from the rover 16 received by the base stations 14 might be corrupted by multipath effects as described above; however, the base stations 14 also receive signals from the transponders 12, and those signals are used for position correction to counter such multipath effects, as will be described in greater detail below.

As is known in the art, the rover 16 is associated with a given base station 14 with which it places outgoing calls and from which it receives incoming calls, and as the rover 16 moves, the base station 14 with which it is associated is changed through a process called "handing off". When a user of the rover 16 places an E-911 call, the rover 16 sends an E-911 request to the base station 14 with which it is currently associated as shown in Step 100 of FIG. 5. That base station 14 receives the request and initiates the process to locate the position of the rover 16. Specifically, it selects transponders 12 to be used to determine the position of the rover 16 in Step 102 and sends a "wake up" call to those transponders 12 in Step 104.

Preferably, the transponders selected are those in the general vicinity of the rover 16. Determination of the general vicinity requires a preliminary position determination which may be done by, e.g., performing a coarse position determination using one or more of the aforementioned AOA, TOA or TDOA techniques without the benefit of the signals from the transponders 12, using a different relatively low-resolution location technique, or simply defining the general vicinity as a predetermined area around the base station 14. Alternatively, the base station 14 may send the wake-up call to all transponders within its communication area. Further, the base station 14 need not send the wake-up call to all targeted transponders 12 itself, and it may instead send requests to other base stations 14 close to it to issue some of the wake-up calls.

Figure 7:
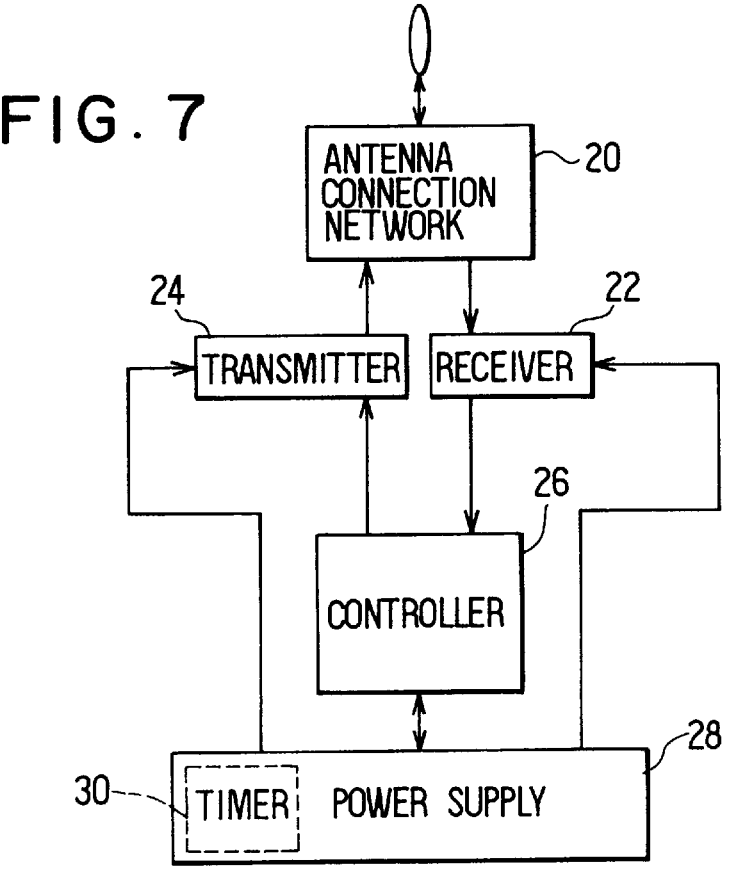
FIG. 7 is a block diagram of a multipath calibration transponder according to the first embodiment.

Each transponder 12 includes an antenna connection network 20 connected to a receiver 22 which receives the wake-up signal from the base station 14, a transmitter 24 which transmits a response signal to the base station 14 as described below, and a controller 26 which controls the operation of the receiver 22 and transmitter 24 and which controls the application of power thereto from a power supply 28 as shown in FIG. 7. Preferably, the power supply is driven by rechargeable batteries, e.g., Ni-MeH or Li-ion units) which may be trickle charged by AC utility mains, or by solar cells, wind power or the like for self-sufficient operation.

Normally, the transponders 12 are in an energy-saving sleep mode in which only those circuits necessary to recognize a wake-up call and activate the remainder of the transponder 12 are active. The sleep mode may be one in which only the receiver 22 and controller 26 are active (the antenna connection network 20 is generally a passive network) so that the receiver 22 can receive the wake-up signal and the controller 26 can direct the power supply 28 to power up the transmitter 24 responsive to receipt of the wake-up signal and drive the transmitter 24 to transmit the response signal, or it may be a slotted sleep mode,. whereby the receiver 22 is normally off and only the controller 26 (or, alternatively, only a power-up timer 30) is active. In this case, the controller 26 directs the power supply 28 to power up the receiver 22 and transmitter 24 periodically to check for a wake-up signal, or the power-up timer 30 similarly controls the other transponder components.

Figure 5:
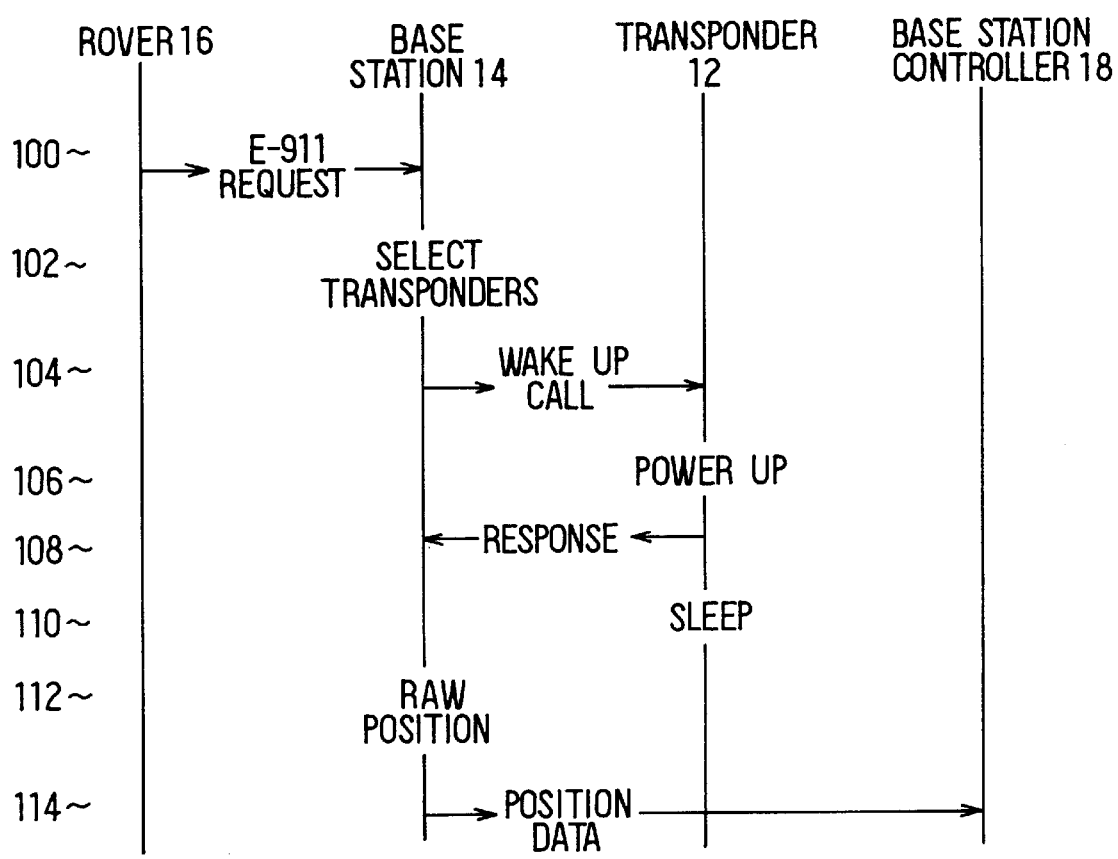
FIG. 5 shows transactions between the rover, base stations and transponders in the first embodiment when determining position of the rover during the course of an E-911 call.

In any case, when a transponder 12 receives a wake-up call, it comes up to full power in Step 106 of FIG. 5, transmits the response signal to all base stations 14 within range in Step 108, and returns to its sleep mode in Step 110. To distinguish the transponder response signals from one another and correlate them with their respective units, each transponder 12 should incorporate a unique identification code in its response signal.

The response signal may be at a predetermined frequency and power level, or it may be at a frequency and power level coded in the wake-up signal. The power level may be a power level used by mobile units such as the rover 16 in normal communications. Alternatively, to ensure that the transponder signal is received by several base stations 14 so that a reliable position determination can be made, the power may be at a level higher than the generally allowed range, i.e., one that is used only for such emergency communications.

Figure 8:
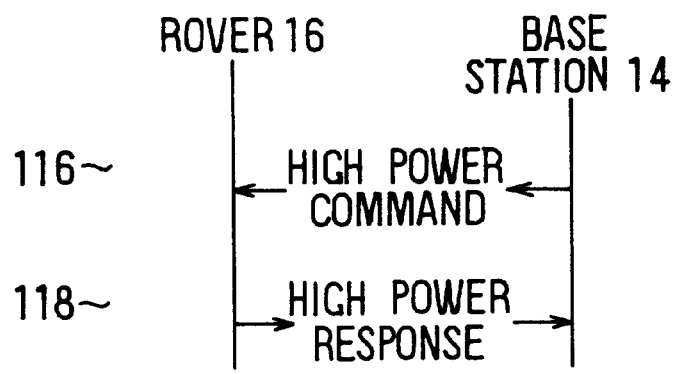
FIG. 8 shows a variation on the first embodiment in which the rover selectively provides a high power transmission.

Along these lines, the base station 14 associated with the rover 16 may also send a command to the rover 16 instructing it to transmit at a higher than normal power level, as shown at Step 116 in FIG. 8. The ensuing high power transmission from the rover 16 in Step 118 ensures that its signal, too, will be received by several base stations 14. This is a special concern in low-power CDMA cellular and PCS communication systems which are designed to provide a single base station communication path to a particular rover and which therefore cannot guarantee connectivity to multiple base stations.

The high power transmission command from the base station 14 to the rover 16 in Step 116 and reception of the rover's response in Step 118 may be performed at any point between reception of the rover's E-911 request in Step 100 and calculation of the rover's raw position in Step 112 (described in greater detail below).

Figure 9:
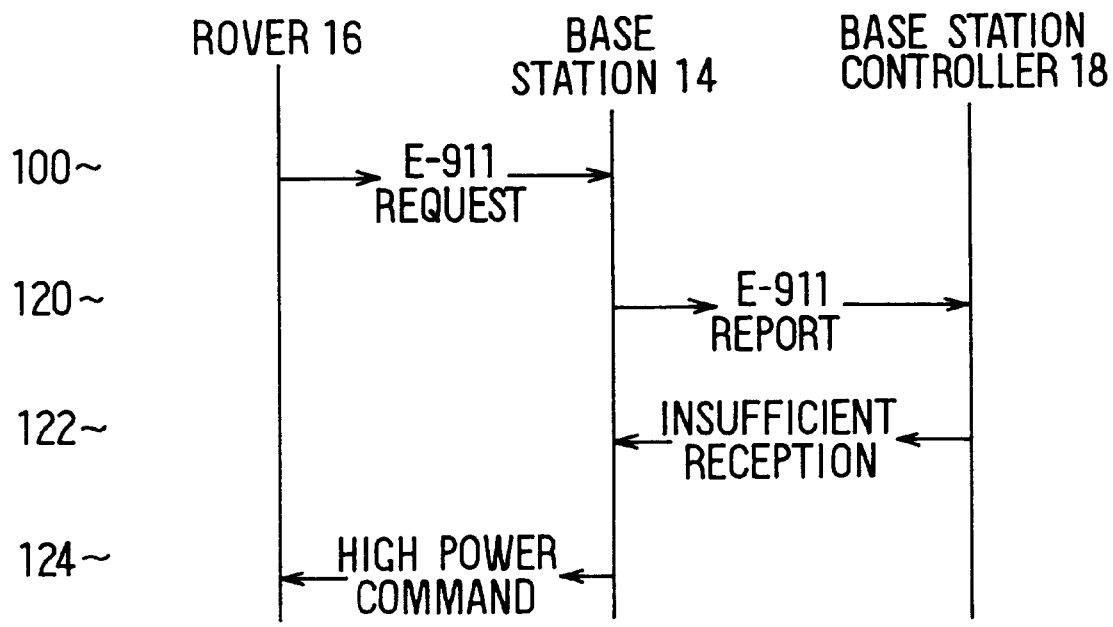
FIG. 9 shows a variation on the first embodiment where the rover's initial E-911 request is not received by enough base stations and it retransmits at a high power level.

Further, to minimize disruption of other communications sessions, the base station 14 might request a high-power response from the rover 16 only when it is advised by the base station controller 18 that the number of other base stations 14 receiving the rover's E-911 request was too small to make an accurate position determination. This function may be implemented if each base station 14 sends an E-911 call report to the base station controller 18 as shown in Step 120 of FIG. 9 responsive to an E-911 call request directed to it or any other base station 14. Then, if the base station controller 18 determines that the number of base stations 14 within range of the rover's normal power level transmissions is too small, it can notify the base station 14 associated with the rover 16 in Step 122 so that the base station 14 can direct the rover 16 to make a high power response in Step 124.

As an alternative to the above techniques, the rover 16 may be designed to always transmit E-911 requests at a high power level. This will simplify system operation; however, it does so at the cost of disrupting communications of other rovers 16 in the area. In any case, high power transmission on the rover end of course requires the use of a modified rover.

Figure 10:
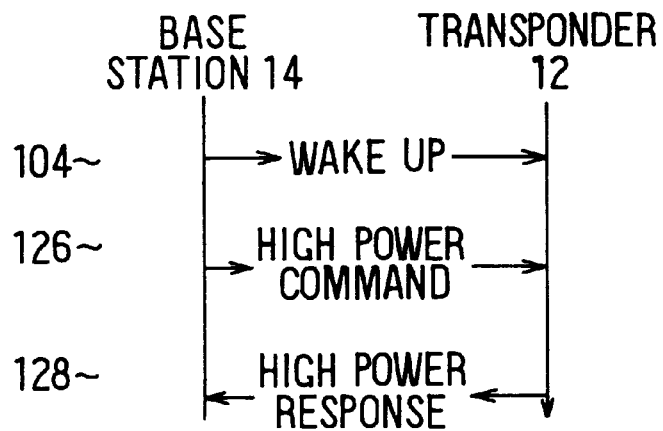
FIG. 10 shows a variation on the first embodiment when a transponder's response is not received by the base station and the transponder retransmits at a high power level.

Similarly, the base station 14 can initially request a normal power level response from the transponders 12 in Step 104 of FIG. 5 and issue a second, high power response request only to transponders 12 whose responses were not received the first time in Step 126 of FIG. 10 so that those transponders 12 provide a response which can be received in Step 128. If the base station 14 still does not receive a response from a particular transponder 12, it may send a message to the base station controller 18 indicating that the transponder 12 may be malfunctioning (the operation of the transponders 12 can also be checked by periodic status polling by the base stations 14). Alternatively, high power transmissions may be authorized by the emergency operator or other authorities. In any case, the transponders 12 may stay awake for a predetermined time period, or until they receive a sleep command from a base station 14, so that they will be able to receive the high power transmission command in Step 126 and make the appropriate response in Step 128.

Each base station 14 receives the response signals from transponders 12 within its communication range in Step 108 of FIG. 5 or Step 128 of FIG. 10 as well as the original E-911 request from the rover 16 in Step 100 of FIG. 5 or its subsequent high-power response in Step 118 of FIG. 8, and the reception conditions of these signals are used to derive coarse position information for each of the transponders 12 and the rover 16 in Step 112 of FIG. 5. For example, each of the base stations 14 may determine the angle of reception of each response signal (for AOA systems), the absolute time of reception of each response signal (for TOA systems) or the relative time of reception of each response signal (for TDOA systems) using a technique known in the art, and in Step 114 provide that information to the base station controller 18.

Since each of the base stations 14 can obtain precisely synchronized timing information via the GPS system, a TDOA technique is used in the preferred embodiment and is supplemented with AOA for added accuracy; however, another technique or combination of techniques may be used instead. Additionally, cellular system information such as which sector the rover 16 is currently located in, handoff information and the like can be used in the position determination process. Further, in areas in which users' traffic patterns are constrained, a geographic database can be used to provide inferred AOA information for use in the process.

Finally, whatever geolocation technique or techniques are used can be augmented with a GPS receiver in the rover 16. The receiver can derive positional GPS information in the normal manner and relay it to its base station 14; however, to minimize the size of the rover and lower its power consumption and cost, the receiver may simply take a "snapshot" of the GPS data it receives and relay it to the base station 14 or another centralized facility for processing. Of course, this approach has the drawback of requiring the use of a modified rover 16.

The base station controller 18 uses the signal information corresponding to the rover 16 to calculate a coarse position for the rover 16, and it uses the signal information corresponding to each of the responding transponders 12 to calculate a coarse position for that transponder. These coarse positions are compared to the known actual positions of the transponders 12 to obtain a multipath distortion vector. The coarse position calculated for the rover 16 is then corrected according to the multipath distortion vector to determine the actual location of the rover 16 free of multipath effects, and this actual location is passed on to the wireline network for transmission to the appropriate authorities during the E-911 session.

Figure 11:
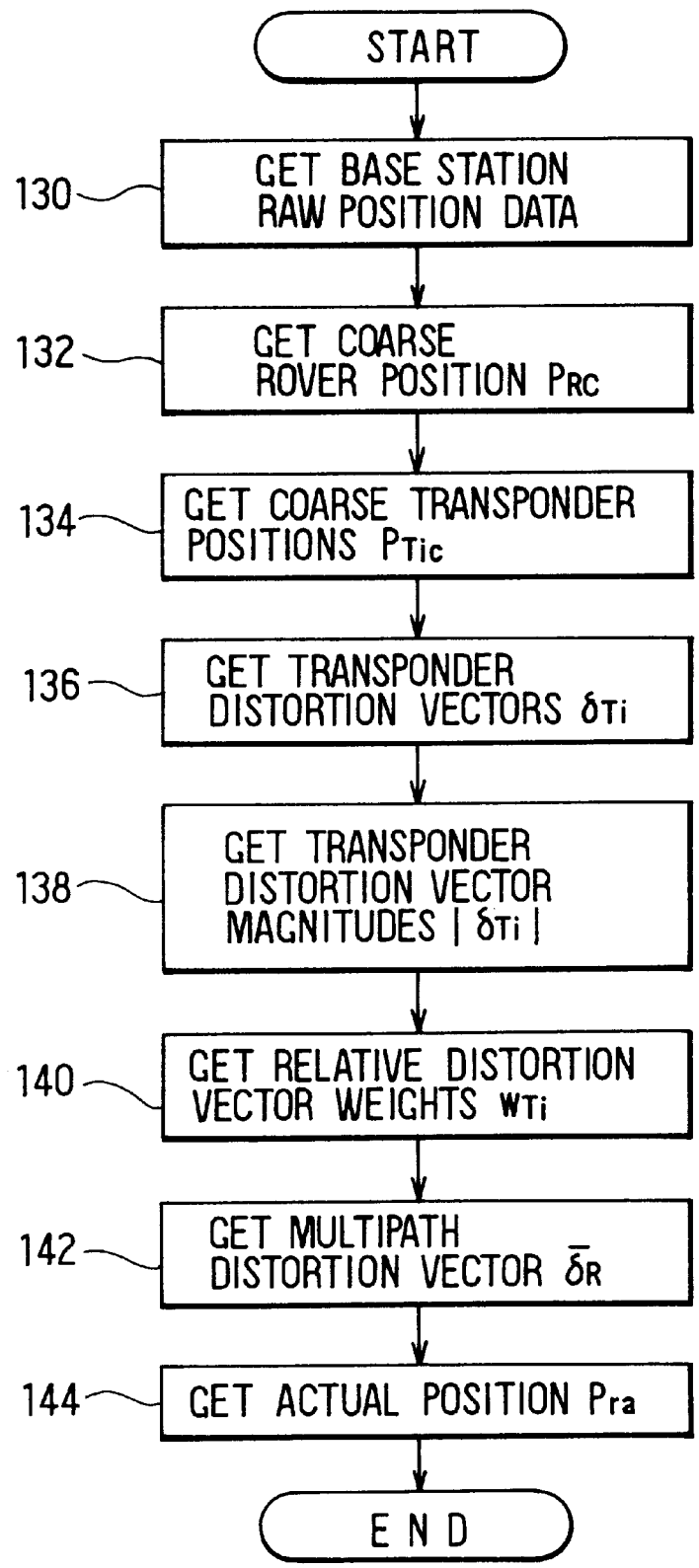
FIG. 11 shows the processing of the base station controller in the first embodiment when correcting the rover's position for multipath distortion.

In other words, assume the base station controller 18 has received raw position data from several base stations 14 as shown in Step 130 of FIG. 11. Then, it then calculates a coarse rover position $P_{Rc}=(x_{Rc}, y_{Rc})$ in Step 132 and in Step 134 calculates n coarse transponder positions $P_{T1c}=(x_{T1c}, y_{T1c})$, $P_{T2c}=(x_{T2c}, y_{T2c}) \ldots P_{Tnc}=(x_{Tnc}, y_{Tnc})$ based on the data from the base stations 14. Then, the actual, known positions of the transponders being denoted by $P_{T1a}=(x_{T1a}, y_{T1a})$, $P_{T2a}=(x_{T2a}, y_{T2a}) \ldots P_{Tna}=(x_{Tna}, y_{Tna})$ the vector $\vec{\delta}_{Ti}$ representing the displacement of each transponder i due to multipath distortion is determined according to the equation $$\vec{\delta}_{Ti}=(x_{Tia}-x_{Tic})\vec{i}+(y_{Tia}-y_{Tic})\vec{j} \qquad (1)$$

in Step 136. Should more base stations 14 than are necessary to make coarse position determinations for the rover 16 and the transponders 12 respond, an appropriate averaging, weighting or other correction technique may be used to obtain the coarse positions, or the additional base station data may be used to correct for geometric dilution of precision, thereby increasing the accuracy of the process.

The magnitude $|\vec{\delta}_{Ti}|$ of each distortion vector $\vec{\delta}_{Ti}$ representing the distance the coarse transponder position $P_{Tic}$ of transponder i is displaced from the actual transponder position $P_{Tia}$ is calculated using the equation $$|\delta_{Ti}| = \sqrt{(x_{Tia}-x_{Tic})^2 + (y_{Tia}-Y_{Tic})^2} \qquad (2)$$

in Step 138. Since the transponders 12 whose predicted positions are closest to the coarse position of the rover 16 are most likely to be representative of the distortion experienced by the rover 16, relative weights $w_{Ti}$ according to proximity of the corresponding transponder 12 to the rover 16 are obtained from the equation $$w_{Ti} = \frac{|\delta_{Ti}|}{\sum_{k=0}^{N} |\delta_{Tk}|} \qquad (3)$$

in Step 140 and the multipath distortion vector $\vec{\delta}_R$ for the rover is calculated in Step 142 as the sum of the weighted transponder distortion vectors:

$$\vec{\delta}_R = x_{\delta R}\vec{i} + y_{\delta R}\vec{j} = \sum_{i=0}^{n} w_{Ti} \cdot \vec{\delta}_{Ti} \qquad (4)$$

Then, the actual position $P_{Ra}$ is calculated from the equation $$P_{Ra}=(x_{Ra}, y_{Ra})=(x_{Rc}+x_{\delta r}, y_{Rc}+y_{\delta R}) \qquad (5)$$

in Step 144, where $\vec{\delta}_R=x_{\delta R}\vec{i}+y_{\delta R}\vec{j}$. The actual position $P_{Ra}$ may then be passed on to emergency authorities at the beginning of the E-911 call session; alternatively, processing may be done while the E-911 call is being initiated and the location sent later.

The above process was discussed in the context of a regularly-spaced array of transponders 12; however, it should be apparent that the relative positions of the transponders 12 are not critical as long as their actual positions are precisely known and they can communicate with the base stations 14. Thus, the invention is equally applicable to irregular distributions of transponders, a fact which is particularly useful in congested urban areas where regular positioning of the devices may not be possible.

Figure 12:
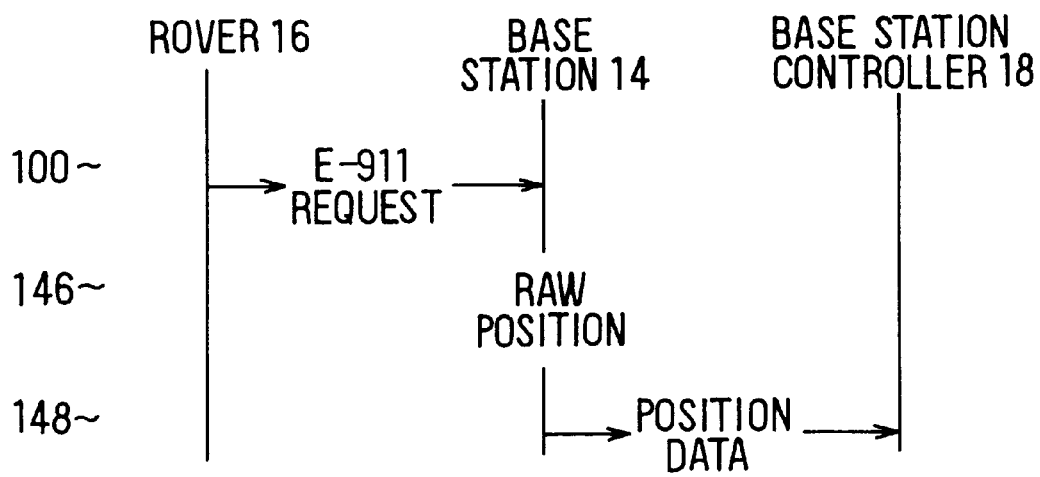
FIG. 12 shows transactions when determining the rover's position according to a second preferred embodiment of the present invention.

Further, it is not even necessary to use multiple transponders, and a transponder need not be available at the time an E-911 call is made. This capability will be explained in connection with a second preferred embodiment of the present invention shown in FIG. 12.

This embodiment dispenses with the multiple transponders used in the first embodiment and instead relies on a previously compiled database of positional correction information. Prior to use of the system to perform any position determinations, a transmitter similar to the transmitter 24 of the transponders 12 used in the previous embodiment is disposed at multiple locations by, for example, physically transporting it in a vehicle. At each location, the location of the transmitter is accurately determined. To obviate the effects of multipath distortion, this may be done in a number of ways. For example, a position determination may be taken over a longer period of time for increased accuracy, or the transmitter's position may be extrapolated from a known position, e.g., one of the base stations, using dead reckoning or surveying techniques.

Once the transmitter's position is known, a signal is sent from the transmitter to the base stations 14, and the raw position data corresponding to the received signal is sent from each base station 14 to the base station controller 18. This process is repeated at a number of different locations n. Then, a coarse position $P_{Tic}$ can be derived from the collected data for a given location i and compared to the corresponding known actual position $P_{Tia}$ to derive a transmitter distortion vector $\bar{\delta}_{Ti}$ for a given position i as described above. The transmitter distortion vectors $\bar{\delta}_{T1}$–$\bar{\delta}_{Tn}$ are then stored in a memory of the base station controller 18.

Figure 13:
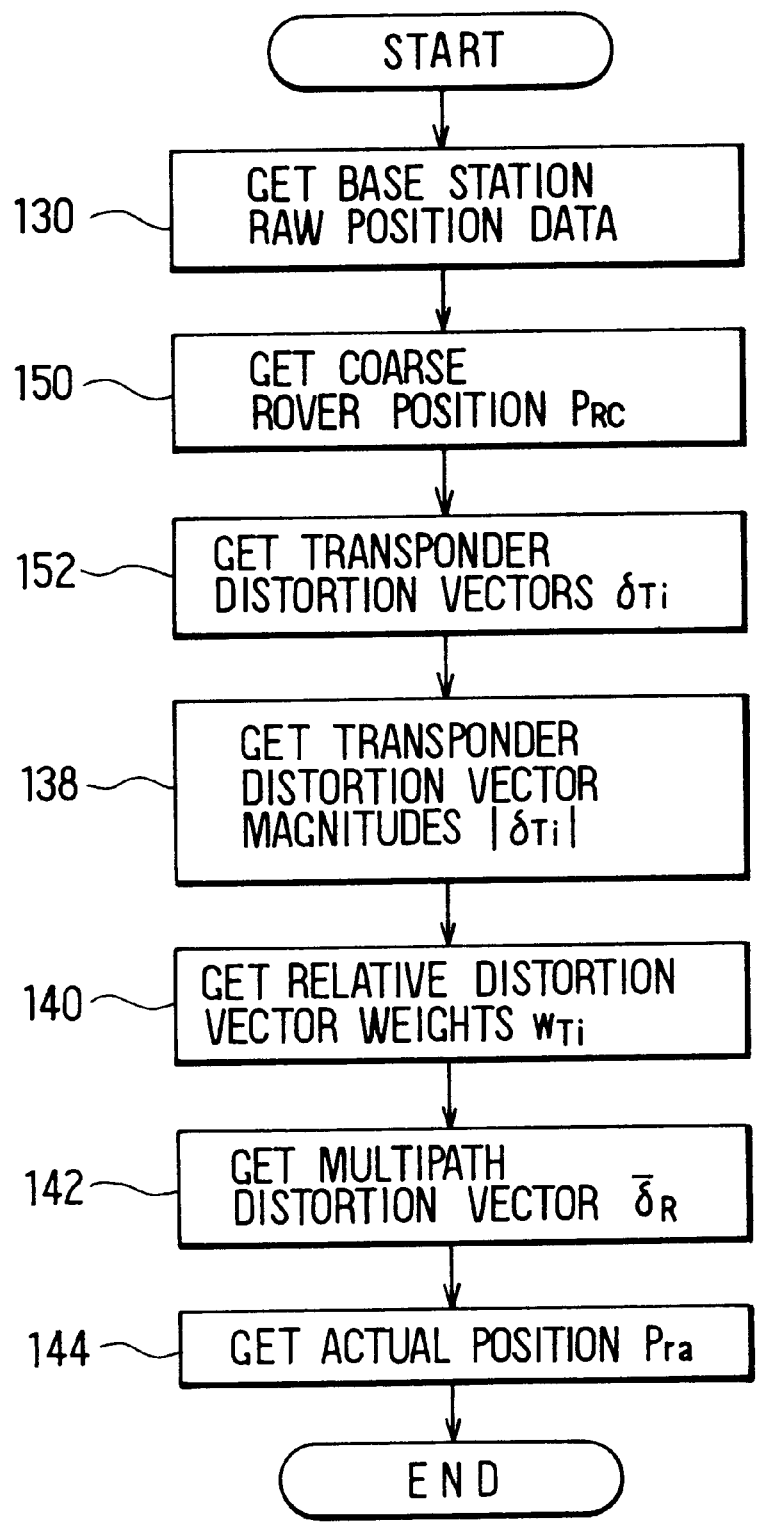
FIG. 13 shows base station controller correction processing in the second embodiment.

When the system is called on to provide a position fix for an E-911 call, the base station 14 receives the E-911 request from the rover 16 in Step 100 of FIG. 11 as in the first embodiment. Then, instead of selecting transponders to wake up, it generates the raw position data in Step 146 of FIG. 12, advises the base station controller 18 of the E-911 request, and provides raw position information for the rover 16 to the base station controller 18 in Step 148. The base station controller 18 receives raw position information from the initiating base station 14 as well as other base stations 14 in Step 150 of FIG. 13, recalls the transmitter distortion vectors $\bar{\delta}_{Ti}$ for previously logged positions in the general vicinity of the rover 16 (as indicated by its coarse position $P_{Rc}$) in Step 152, calculates relative magnitudes $w_{Ti}$ of the transponder distortion vectors $\bar{\delta}_{Ti}$ in Step 138 and obtains the multipath distortion vector $\bar{\delta}_R$ as described above in Step 140. Then, the rover's coarse position $P_{Rc}$ is corrected in Step 142 to obtain the actual rover position $P_{ra}$ which is then passed to the wireline network.

This embodiment has the advantage of avoiding deployment of a potentially expensive array of multipath calibration transponders; however, it can only counteract the effects of static multipath distortion, and cannot deal with dynamic distortion components.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A position determining system comprising:
    a mobile communication device for issuing a communication signal;
    a plurality of transmitters, each for issuing a calibration signal;
    a plurality of first stations, each for receiving said communication signal and said calibration signal and generating reception information based on characteristics of said communication signal and said calibration signals as received thereat; and
    a second station for receiving said reception information from said first stations, determining a corrected position of said mobile communication device using said reception information corresponding to said transmitters, and providing said corrected position to a communication network wherein:
    at least one of said first stations is further for sending a wake-up command to at least one of said transmitters; and
    at least one of said transmitters is a transponder which has a sleep mode in which, responsive to said wake-up command, it switches to an active mode to issue its calibration signal, a rate of power consumption of said sleep mode being lower than a rate of power consumption of said active mode.

2. A method of detecting a position of a roving mobile communicating unit, comprising:
    establishing a communication between a mobile communicating unit and a base station;
    determining an emergency signal from said mobile communicating unit;
    determining a coarse position of said mobile communication unit, using a position detection function;
    identifying a plurality of local units to be used in position determination of the mobile communicating unit;
    sending a wake-up command to at least a plurality of said local units;
    in each of the plurality of local units, changing from a low-power-consuming sleep mode to a higher power-consuming transmission mode responsive to reception of said wake-up signal,
    in each of the plurality of local units, transmitting respective calibration signals;
    receiving said calibration signals from said plurality of local units, and using said calibration information to form position correction information; and
    using said position correction information along with said course position, to find a corrected position of said mobile communicating unit.

3. A method as in claim 2 wherein there are a plurality of base stations, each said base station receiving information from a plurality of local units which are local thereto.

4. A method as in claim 2 wherein said local units respond at a power level higher than an allowable power level for normal communications.

5. A method as in claim 3 wherein said local units are physically separate from said base stations.

6. A method as in claim 2 further comprising in the local units, re-entering an energy-saving sleep mode after completing the transmission.

7. A method as in claim 2 wherein said local units are powered by a trickle charge element.

8. A method as in claim 2 wherein each local unit includes an identification code that is unique to said each local unit as part of its calibration signal, said calibration signals being received by said base stations, and wherein said base station identifies each local unit by its identification code.

9. A method as in claim 2 further comprising commanding said mobile telephone to increase a power level to a higher-than-normal power level, and increasing said power level in said mobile telephone to said higher than normal power level.

10. A method as in claim 9 further comprising receiving said higher-than-normal power level in a plurality of said base stations, and carrying out said position detection in all of said plurality of base stations.

11. A method as in claim 9 further comprising detecting that a number of base stations receiving the request is too small to make an accurate position determination, and if so, commanding said mobile station to its high power mode.

12. A method as in claim 2 further comprising detecting a specified condition, and commanding said local units to respond at a power level higher than that ordinarily allowed for communication responsive to said specified condition.

13. A method as in claim 2 further comprising using signal information from the local units to calculate a multipath distortion vector, and using said multipath distortion vector to compensate for the course position of said mobile station.

14. A position determination system, comprising:
   a mobile communication device operating to produce a communication signal;
   a plurality of base stations, including signal receivers which receive communications from said mobile communication device;
   a plurality of spaced local units, normally operating in a power-reduced sleep mode, in which they have at least one operating circuit in a reduced power mode to save power, and which are responsive to a specified wake-up signal to power up said at least one operating circuit to transmit calibration signals, said calibration signals being received by said base station; and
   a position detecting element, operating based on said communication signal and said calibration signal, to detect a corrected position of said mobile communication unit based on both said communication signal and said calibration signal.

15. A system as in claim 14 wherein said position detecting signal produces a course position based on said communication signal, and produces a correction factor for said communication signal based on said calibration signals.

16. A system as in claim 14 wherein said mobile communication device includes an element for issuing said communication signal at a power level higher than that allowed for normal communications, said higher-than-normal level signal being for emergency location.

17. A system as in claim 14 wherein said plurality of local units selectively produce an output power level at a level higher than normally allowed for normal communications, said higher-than-normal level signal being for emergency location.

18. A system as in claim 14, wherein said mobile communication device is a cellular telephone.

19. A system as in claim 18 wherein said mobile communication device is an IS-95 system.

20. A system as in claim 14, further comprising a charge storage device in each of said local units, and a trickle charger, operating to charge said charge storage device.

21. A mobile communication device with emergency capabilities, comprising:
   a cellular telephone package including a casing, antenna, and keyboard;
   mobile telephone electronics, within said casing, including a transmitter and receiver, said transmitter normally transmitting with a first transmit power that is within a transmit power allowed for normal communications;
   said mobile telephone also including a user interface which enables initiating an emergency call request, and said cellular electronics operating, responsive to a specified command associated with an emergency call to increase its transmit power level to a power level higher than the transmit power allowed for normal communications.

22. A system as in claim 21 wherein said mobile unit includes a structure which is responsive to said emergency call request to always operate in the higher-power mode during said emergency call request.

23. A system as in claim 21, wherein the mobile telephone includes an element for detecting a reception from a base station with which the mobile unit is communicating, said reception indicating initiation of a higher-power mode, said mobile telephone operating in said higher-power mode responsive to said reception indicating initiation of a higher-power mode.

24. An apparatus as in claim 21 wherein said mobile telephone receives a high power command, and enters said high power state in response thereto.

25. A method of operating a mobile cellular telephone in communication with a base station, comprising:
   normally carrying out communication with the base station at a first power level within an allowed power level for communication;
   determining a request for an emergency telephone call at the mobile station; and
   increasing the power at the mobile station beyond that first power normally allowed for communications, to a second power level allowed for emergency communications only, responsive to said request and transmitting said request at said second power level.

26. A method as in claim 25 further comprising sending a command from the base station to the mobile station requesting higher power, and receiving said command in said mobile station, and responding at said second power level.

27. A method as in claim 26 further comprising initially transmitting the emergency request from said mobile station to the base station at said normal power, determining in the base station if a sufficient reception has been received at said normal power, and if not, sending said command for said mobile station to transmit at the higher power.

28. A method as in claim 26 further comprising receiving said higher-power transmission at a plurality of said base stations.

29. A method as in claim 28, further comprising using said higher power transmission to estimate a position of said mobile station.

30. A method as in claim 29 further comprising receiving additional signals, and using said additional signals to compensate for multipath distortion.

31. A method as in claim 30 further comprising sending a wake up command to a plurality of additional elements that are normally in a power-reduced mode, and further comprising waking said additional components up from said power-reduced mode to send said additional signals.

32. A method as in claim 31 further comprising enabling said additional components to transmit at a level higher than said allowable range for said communication.

33. A method as in claim 25 wherein said communication between said mobile unit and said base station is a cellular telephone type communication.

34. A method as in claim 33 wherein said communication between said mobile unit and said base station is an IS-95 system.

35. A device as in claim 21 wherein said mobile telephone is an IS-95 telephone.

36. A mobile telephone unit for IS-95 communication, comprising:

an IS-95 cellular telephone, including a user interface, a package, a keyboard, and a transceiver, and including cellular electronics, enabling normal communication using an IS-95 telephone standard, said normal communication occurring at a first power level which is within a generally accepted range for cellular communication, said user interface including an element which allows entering an emergency mode, in which the IS-95 cellular telephone operates in said emergency mode, and in which emergency signals can be transmitted at a power level higher than that allowed for normal communications.

37. A method of tracking a cellular telephone, comprising:

detecting an emergency transmission from the cellular telephone;

performing a course position determination by determining some aspect of the reception of the signal from the cellular telephone;

sending a wake-up signal to a calibrating transmitter, said wake-up signal commanding said transmitter to change from a sleep state in which at least one item of circuitry thereof is unpowered, to an awake state in which the transmission circuitry is powered and to send calibration signals;

receiving said calibration signal, and determining a correction factor from said calibration signal;

after sending said calibration signal, said calibrating transmitter again entering said sleep state; and using said calibration signal to correct for errors in said course position detecting signal.

38. A method as in claim 37 further comprising using a plurality of said calibrating transmitters, and selecting a number of said calibration circuits close to said mobile telephone.

39. A method as in claim 37 wherein at least one of said calibrating transmitters has a capability of transmitting at a level higher than a power which is normally accepted for communication over the cellular system.

40. A method as in claim 37 further comprising sending a command to the mobile telephone instructing the mobile telephone to transmit at a level higher than normal power level, responding in the mobile telephone by transmitting at said level higher than the normal power level; and receiving said higher-level signal in at least one base station.

41. A method as in claim 40 further comprising receiving said signal in a plurality of said base stations and processing said higher-level power signal in each of said plurality of base stations.

42. A mobile telephone system with emergency position location detection, comprising:

a cellular telephone, including cellular electronics enabling communication with a base station at a first power level within the power level that is allowed for mobile communications, and also having an emergency notification capability, to send an emergency message, said mobile telephone capable of, during said emergency message, transmitting at a power level higher than a power level allowable during normal cellular communications;

a plurality of calibrating units, separate from said mobile unit, said calibrating units operating to provide multipath distortion information from which a course position of said mobile telephone can be corrected; and a position detecting device, receiving the transmission from the mobile telephone, and receiving calibration information from said calibration units, and operating to determine corrected position information for the mobile phone from both the transmission and from said calibration information, said position-detecting device determining a condition in which increased power from the mobile telephone is desirable, and transmitting a request for increased power to the mobile telephone, the mobile telephone including an element receiving said request for increased power and responding by transmitting at said increased power higher than that allowable during normal cellular communications.

43. A system as in claim 42 wherein said calibrating units are normally in sleep mode and are awoken by a request for calibration information, and when in sleep mode said calibrating units consuming less power than when out of said sleep mode.

44. A system as in claim 43, wherein at least one of said calibrating units comprises a rechargeable battery normally driving the calibrating unit, and a trickle recharging system.

45. A method of detecting a position of a roving mobile communicating unit, comprising:

establishing a communication between a mobile communicating unit and at least one base station;

determining an emergency signal from said mobile communicating unit;

determining a course position of said mobile communication unit, using a position detection function;

identifying a plurality of local units to be used in position determination of the mobile communicating unit roving base station;

initiating communication with a plurality of local calibrating units, physically separate from said at least one base station;

receiving calibration signals from each of the plurality of local calibrating units;

using said calibration information to form position correction information; and using said position correction information along with said course position, to find a corrected position of said mobile communicating unit.

46. A method as in claim 45, wherein said local calibration units are usually in a power-reduced sleep mode, and are removed from said sleep state to produce said calibration signal.

47. A position determination system, comprising:

a mobile communication device operating to produce a communication signal;

a plurality of base stations, including signal receivers which can receive communications from said mobile communication device;

a plurality of spaced local units, normally operating in a power-reduced sleep mode, in which they have at least one operating circuit in a reduced power mode to save power, and which are responsive to a specified wake-up signal to power up said at least one operating circuit to transmit calibration signals, said local units each being powered by a charge storage unit that receives either intermittent charge and/or trickle charge; and a position detecting element, operating based on said communication signal and said calibration signal, to detect a corrected position of said mobile communication unit based on both said communication signal and said calibration signal.

* * * * *